(12) United States Patent
Kadirkamanathan et al.

(10) Patent No.: US 8,190,420 B2
(45) Date of Patent: May 29, 2012

(54) AUTOMATIC SPOKEN LANGUAGE IDENTIFICATION BASED ON PHONEME SEQUENCE PATTERNS

(75) Inventors: Mahapathy Kadirkamanathan, Cambridge (GB); Christopher John Waple, Cambridge (GB)

(73) Assignee: Autonomy Corporation Ltd., Cambridge, England (GB)

( * ) Notice: Subject to any disclaimer, the term of this patent is extended or adjusted under 35 U.S.C. 154(b) by 402 days.

(21) Appl. No.: 12/535,038

(22) Filed: Aug. 4, 2009

(65) Prior Publication Data

US 2011/0035219 A1    Feb. 10, 2011

(51) Int. Cl.
G06F 17/20    (2006.01)

(52) U.S. Cl. ............. 704/8; 704/2; 704/3; 704/4; 704/5; 704/7

(58) Field of Classification Search .................... 704/2–8
See application file for complete search history.

(56) References Cited

U.S. PATENT DOCUMENTS

| | | | |
|---|---|---|---|
| 4,761,815 A | | 8/1988 | Hitchcock |
| 5,636,325 A | * | 6/1997 | Farrett ........................... 704/258 |
| 5,805,771 A | * | 9/1998 | Muthusamy et al. ......... 704/232 |
| 5,832,425 A | | 11/1998 | Mead |
| 6,188,976 B1 | | 2/2001 | Ramaswamy et al. |
| 6,487,533 B2 | * | 11/2002 | Hyde-Thomson et al. ... 704/260 |
| 6,535,849 B1 | * | 3/2003 | Pakhomov et al. ........... 704/235 |
| 6,668,256 B1 | | 12/2003 | Lynch |
| 6,882,970 B1 | * | 4/2005 | Garner et al. ................. 704/236 |
| 6,912,499 B1 | * | 6/2005 | Sabourin et al. ............. 704/243 |
| 7,143,033 B2 | * | 11/2006 | Belenger et al. ............. 704/235 |
| 7,206,303 B2 | | 4/2007 | Karas et al. |
| 7,272,594 B1 | | 9/2007 | Lynch et al. |
| 7,292,979 B2 | * | 11/2007 | Karas et al. ................... 704/244 |
| 7,295,979 B2 | * | 11/2007 | Neti et al. ...................... 704/243 |
| 7,406,408 B1 | * | 7/2008 | Lackey et al. ...................... 704/8 |
| 7,478,038 B2 | | 1/2009 | Chelba et al. |

(Continued)

FOREIGN PATENT DOCUMENTS

EP    1 484 774 A1    12/2004

(Continued)

OTHER PUBLICATIONS

Cross Reference to Related Applications Under 37 CRF 1.78, 2 pages, Sep. 2011.

(Continued)

*Primary Examiner* — Douglas Godbold
(74) *Attorney, Agent, or Firm* — Rutan and Tucker, LLP

(57) ABSTRACT

A language identification system that includes a universal phoneme decoder (UPD) is described. The UPD contains a universal phoneme set representing both 1) all phonemes occurring in the set of two or more spoken languages, and 2) captures phoneme correspondences across languages, such that a set of unique phoneme patterns and probabilities are calculated in order to identify a most likely phoneme occurring each time in the audio files in the set of two or more potential languages in which the UPD was trained on. Each statistical language models (SLM) uses the set of unique phoneme patterns created for each language in the set to distinguish between spoken human languages in the set of languages. The run-time language identifier module identifies a particular human language being spoken by utilizing the linguistic probabilities supplied by the one or more SLMs that are based on the set of unique phoneme patterns created for each language.

21 Claims, 5 Drawing Sheets

U.S. PATENT DOCUMENTS

| | | | |
|---|---|---|---|
| 7,552,045 B2* | 6/2009 | Barliga et al. | 704/8 |
| 7,761,297 B2* | 7/2010 | Lee | 704/252 |
| 7,949,517 B2* | 5/2011 | Eckert et al. | 704/8 |
| 7,974,843 B2* | 7/2011 | Schneider | 704/254 |
| 2001/0056348 A1* | 12/2001 | Hyde-Thomson et al. | 704/260 |
| 2002/0087315 A1* | 7/2002 | Lee et al. | 704/256 |
| 2002/0111794 A1* | 8/2002 | Yamamoto et al. | 704/200 |
| 2002/0184003 A1* | 12/2002 | Hakkinen et al. | 704/8 |
| 2003/0088397 A1* | 5/2003 | Karas et al. | 704/1 |
| 2003/0191643 A1* | 10/2003 | Belenger et al. | 704/254 |
| 2004/0088163 A1* | 5/2004 | Schalkwyk | 704/251 |
| 2004/0204942 A1* | 10/2004 | Lee | 704/254 |
| 2005/0033575 A1* | 2/2005 | Schneider | 704/254 |
| 2005/0234722 A1 | 10/2005 | Robinson et al. | |
| 2006/0229864 A1* | 10/2006 | Suontausta et al. | 704/8 |
| 2007/0299666 A1* | 12/2007 | Li et al. | 704/236 |
| 2008/0147380 A1* | 6/2008 | Barliga et al. | 704/9 |
| 2008/0162146 A1* | 7/2008 | Eckert et al. | 704/275 |
| 2008/0255844 A1 | 10/2008 | Wu | |
| 2009/0248395 A1* | 10/2009 | Alewine et al. | 704/7 |
| 2009/0313007 A1* | 12/2009 | Bajaj et al. | 704/3 |
| 2009/0326945 A1* | 12/2009 | Tian | 704/254 |
| 2011/0004473 A1* | 1/2011 | Laperdon et al. | 704/243 |

FOREIGN PATENT DOCUMENTS

| | | | |
|---|---|---|---|
| GB | 2354101 A | | 3/2001 |
| GB | 2381638 A | | 5/2003 |
| GB | 2381688 A | | 5/2003 |
| GB | 2388738 A | | 11/2003 |
| GB | 2388739 A | | 11/2003 |
| GB | 2457855 A | | 9/2009 |
| GB | 2465383 A | | 5/2010 |
| GB | 2468203 A | | 9/2010 |
| WO | WO 2008/124368 A1 | | 10/2008 |

OTHER PUBLICATIONS

United Kingdom Intellectual Property Office, Search Report for UK Patent Application No. GB 1003097.1, May 13, 2010, 4 pages.

United Kingdom Intellectual Property Office, Search Report for UK Patent Application No. GB 100758.4, Sep. 3, 2010, 4 pages.

United Kingdom Intellectual Property Office, Search Report for UK Patent Application No. GB 1010370.3, Oct. 15, 2010, 4 pages.

Iyer, Rukmini et al., "Using Out-of-Domain Data to Improve In-Domain Language Models," IEEE Signal Processing Letters, vol. 4, No. 8, Aug. 1997, pp. 221-223.

Gale, William A., et al., "Good-Turing Frequency Estimation Without Tears," http://www.grsampson.net/AGtfl.html, May 1, 2009, pp. 1-23.

Niesler, Thomas, et al., "Language Identification and Multilingual Speech Recognition Using Discriminatively Trained Acoustic Models," Harman/Becker Automotive Systems, Published prior to filing of patent application, 6 pages, 2006.

Rapajic, Uros, "Using Phone Recognition and Language Modelling (PRLM) for Automatic Language Identification," http://www.doc.ic.ac.uk/nd/surprise_96/journal/vol12/ur1/article2.html, 1996, 8 pages.

* cited by examiner

Identification Phase:

AUTOMATIC SPOKEN LANGUAGE IDENTIFICATION BASED ON PHONEME SEQUENCE PATTERNS

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to speech recognition, text compression, language identification and cryptography. More particularly, an aspect of an embodiment of the invention relates to language identification.

BACKGROUND OF THE INVENTION

In continuous speech, it is nearly impossible to predict ahead of time when the beginning and ending of words in the stream of continuous speech will individually begin and stop.

SUMMARY OF THE INVENTION

Various methods and apparatus are described for a language identification engine. The language identification engine includes at least the following components. A front end module having an input configured to receive an audio stream consisting of a spoken language of at least one of a set of two or more potential languages being spoken in the audio stream under analysis. A universal phoneme decoder that contains a universal phoneme set representing both 1) all phonemes occurring in the set of two or more spoken languages, and 2) captures phoneme correspondences across languages such that a set of unique phoneme patterns and probabilities are calculated in order to identify a most likely phoneme occurring each time in the audio stream in the set of two or more potential languages in which the universal phoneme decoder was trained on. One or more statistical language models having logic configured to supply to a run-time language identifier module probabilities of how linguistically likely a particular uttered phoneme identified by the universal phoneme decoder comes from a particular spoken language based on an identified sequence of phonemes. The statistical model uses linguistic features from the identified phonemes from the universal phoneme decoder including the set of unique phoneme patterns created for each language to distinguish between spoken human languages in the set of two or more spoken languages. A bank of human language specific databases for the one or more statistical language models to reference. Each of the databases was filled with phoneme and phoneme sequences being trained on for a particular language in the set of two or more spoken languages, and each of the databases received the phoneme and phoneme sequences from a phone output from the same universal phoneme decoder independent of which spoken language in the set of two or more potential languages was being trained on. The run-time language identifier module identifies a particular human language being spoken in the audio stream in the set of two or more potential languages by utilizing the linguistic probabilities supplied by the one or more statistical models that are based on the set of unique phoneme patterns created for each language.

BRIEF DESCRIPTION OF THE DRAWINGS

The drawings refer to embodiments of the invention in which.

Figure 1:
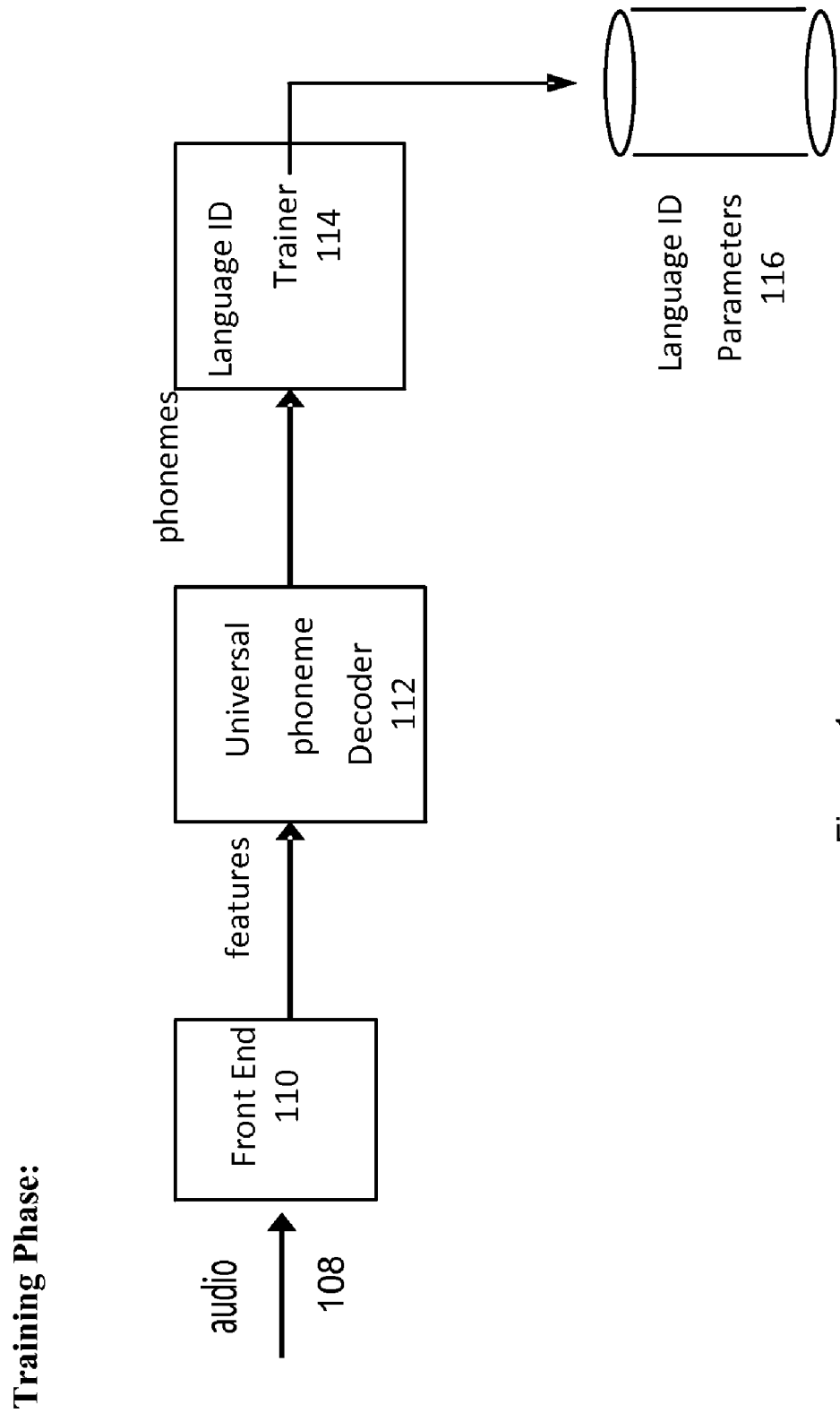
FIG. 1 illustrates a block diagram of a language identification engine in a training phase.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of formulas, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first input, may be made. However, the specific numeric reference should not be interpreted as a literal sequential order but rather interpreted that the first input is different than a second input. Further steps performed in one embodiment may also be combined with other embodiments. Thus, the specific details set forth are merely exemplary. The specific details may be varied from and still be contemplated to be within the spirit and scope of the present invention.

In general, a language identification engine may be described. The language identification engine includes at least the following components. A front end module having an input configured to receive an audio stream consisting of a spoken language of at least one of a set of two or more potential languages being spoken in the audio stream under analysis. A universal phoneme decoder that contains a universal phoneme set representing both 1) all phonemes occurring in the set of two or more spoken languages, and 2) captures phoneme correspondences between languages such that a set of unique phoneme patterns is created for each language, in order to identify a most likely phoneme occurring each time in the audio stream for each of the languages in the set of two or more potential languages in which the universal phoneme decoder was trained on. One or more statistical language models having logic configured to supply to a run-time language identifier module probabilities of how linguistically likely a particular uttered phoneme identified by the universal phoneme decoder comes from a particular spoken language based on an identified sequence of phonemes. The statistical model uses linguistic features from the identified phonemes from the universal phoneme decoder including the set of unique phoneme patterns created for each language to distinguish between spoken human languages in the set of two or more spoken languages. A bank of human language specific databases for the one or more statistical language models to reference. Each of the databases was filled with phoneme and phoneme sequences being trained on for a particular language in the set of two or more spoken languages, and each of the databases received the phoneme and phoneme sequences from a phone output from the same universal phoneme decoder independent of which spoken language in the set of two or more potential languages was being trained on. The run-time language identifier module identifies a particular human language being spoken in the audio stream in the set of two or more potential languages by utilizing the one or more statistical models. The language identification system that may be used with for example, a continuous speech recognition engine that includes various components that includes front end filters, a speech recognition decoder module, one or more statistical language models, and an output module.

FIG. 1 illustrates a block diagram of a language identification engine in a training phase. The language ID system can be divided into two phases: training and recognition. The training phase is when various statistics are gathered. The run-time language identification recognition phase is when probability estimates, based on these statistics, are provided to the run-time language identification module on demand. During this training phase, the databases of phonemes and special N-gram phoneme sequences are filled/populated.

The acoustic input to the front end module coupled to the universal phoneme decoder produces a sequence of phone labels that is fed to fill a bank of human language specific databases for one or more statistical language models each trained to a particular human language to be identified. In an embodiment, the training on each human language occurs one language at time to maximize an accuracy of both a per-language recognition accuracy in identifying a correct phoneme being spoken in that language as well as a language identification process of which language is being spoken.

During training [or even run time], the user interface 108 of the language identification system has an input to receive the supplied audio files from a client machine over the wide area network and supply the supplied audio files to the front end filters 110. Note the input could equally as well come from a live microphone or other similar device. The training phase involves presenting the system with examples of speech from a variety of languages. A set of languages will be trained on for example a set of 3-10 languages will be trained on and the universal phoneme decoder will contain a universal phoneme set to cover all or most of the trained on languages.

The speech recognition front-end filters and phoneme decoder 110 convert the supplied audio file of a continuous voice communication into a time-coded sequence of sound feature frames for speech recognition. The front end filters 110 filter out the background noise from the audio file, analyze the sounds within the audio file to discrete phonemes (as known and referred herein as phones as well) and assign a common time code to the audio sounds occurring in supplied file. The front-end filters 110 also transform the audio sounds into a sequence of sound feature frames, which include sound vectors, which in essence capture the data vectors of the sounds. The supplied audio file is time coded. The common time line may be measured in microseconds, audio frames, video frames, or some other measure of time. The multidimensional sound feature frames that include sound data vectors come out of the front end filters 110 at a regular interval. Thus, the front end filters 110 output the time coded sequence of sound feature frames that include sound data vectors at a regular interval to supply the same sound feature frames for analysis.

In an embodiment, when a person speaks, vibrations in the air can be captured as an analog signal. The analog signal may be the supplied audio file. An analog-to-digital converter (ADC) translates this analog wave into digital data that the engine can understand. To do this, the front end filters 110 sample, or digitize, the sound by taking precise measurements of the wave at frequent intervals. The front end filters 110 filter the digitized sound to remove unwanted noise, and sometimes to separate it into different bands of frequency (as differences in human pitch). The front end filters 110 also normalize the sound, or adjust the sound to a constant volume level. The sound signal may also have to be temporally aligned. People do not always speak at the same speed, so the sound must be adjusted to match the speed of the template sound samples already stored in the system's databases. The system may use these coded sounds as sound feature frames.

The universal phoneme decoder 112 uses a "universal phoneme" analysis verses a "specific language" phoneme analysis. The universal phoneme decoder contains a universal phoneme set representing both 1) all phonemes occurring in a particular set of languages, and 2) captures phoneme correspondences between languages such that a set of unique phoneme patterns is created for each language. The unique phonemes and/or phoneme sequences may only occur in that language or in a few languages, and on the other end of the spectrum, the unique phoneme and/or phoneme sequence may occur so often/with such a high occurrence rate in a particular language compared to other languages that the occurrence of this phoneme accompanied by multiple occurrences of this phoneme occurring within a short set time period is also a good indicator at identifying that a particular language is being spoken. The universal phoneme set in the universal phoneme decoder 112 for each language in the set of human languages will most likely contain phones, phoneme sequences, and/or a combination of both.

Thus, the set of fundamental sounds that make up a spoken language differ from one to the other spoken language. There will be some common acoustic sounds between two languages whilst others will be different. These fundamental sounds are phonemes. Each language therefore will have a set of unique phoneme patterns as well as common phoneme patterns compared to other languages. The run-time language identifier module 218 queries the one or more statistical language models cooperating with the human language specific databases 116 filled in the training process to observe enough phoneme sequences that correspond to spoken audio so that the language identifier should be able to identify the spoken language by utilizing these statistical models 216.

For example, differences exist in the statistics of phonemes in one spoke language compared to other spoken languages:

The most apparent differences between some languages are that some sound patterns are unique to a single or just a few spoken languages. However, even in some languages that have similar sounds: the consonant space is more discrete than the vowel space, so there is less scope for small and non-meaning-bearing distinctions within; the phoneme inventories of the compared languages show that, while they have significantly different vowel inventories, their consonant inventories overlap greatly; while vowels were considered to occur one per syllable (i.e. long vowels and diphthongs were treated as single vowels), unlike vowels consonants can occur in clusters at either the beginning or end of syllables; unlike vowels, consonants can be lost altogether in some languages; and other similar acoustic differences do exist.

Next, the universal phoneme decoder 112 may have audio attribute filters that are based upon decomposing digitized speech into its phonetic constructs. The phonetic sequence is then analyzed in conjunction with acoustic model and statistical probabilities to calculate which is the most probable phoneme in the acoustic data being analyzed.

In an embodiment, the audio attribute filters use neural network technology and "Hidden Markov Models" (HMMs) to construct an acoustic model that is able to provide a fast, accurate and dynamic solution within variable and rapidly changing acoustic environments. The audio attribute filters recognize human speech and logs every spoken word against a common time reference such as a time clock indication or video frame.

The sound signal is divided into small segments as short as a few hundredths of a second, or even thousandths in the case of plosive consonant sounds—consonant stops produced by obstructing airflow in the vocal tract—like "p" or "t." The phoneme decoder 112 then matches these segments to known phonemes in the appropriate language. A phoneme is the smallest element of a language—a representation of the sounds we make and put together to form meaningful expressions. There are roughly 40 phonemes in the English language (different linguists have different opinions on the exact number), while other languages have more or fewer phonemes.

The phoneme decoder 112 may compare the sound pattern of each phoneme to a set of phoneme models to recognize the sound feature frames as a sequence of phonemes and identifies each phoneme to that database of known phonemes. The phone output of the phoneme decoder 112 supplies each identified phoneme in the series of identified phonemes to the input of the language ID trainer 114.

Note, the universal phoneme decoder 112 may assign a symbolic code to each phoneme based upon recognition of the phonemes from a predetermined set. A database as part of the universal phoneme decoder may contain a standard waveform representation of each phoneme from the predetermined set.

Overall, the training phase includes the phoneme decoder 112 tokenizing messages in each language (i.e. converting them into identified phones), the language ID trainer 114 analyzing the resulting phones and the phone sequences, and then the language ID trainer 114 fills the language ID parameter databases 116 for the probability model for each language on a per language basis. The phoneme sequence information is modeled in the statistical language model using discrete Markov models (HMMs). The use of a universal phoneme decoder 112 applied to each language, as opposed to a phone decoder being specifically trained to the language being tested, allows a more consistent output from the received audio data input. The statistical language models 216 tend to predict the correct language with consistent data rather than with data that is more accurate.

The model for the statistics of the phones and phone sequences has been computed based on the output from the universal phoneme decoder 112. N-grams are basically subsequences of n symbols (phones in this case), and we count their occurrences. During training, the statistical language models accumulate a set of n-gram sequences of phonemes histograms, one per language, in an assumption that different languages will have different n-gram histograms. The language ID trainer 114 then approximates the n-gram distribution as the weighted sum of the probabilities of the n-gram sequence of phonemes and supplies this back to the statistical language model for that language. In essence the statistical language model compares both the ratios of counts of phone sequences observed in the training data compared to 1) how often particular phonemes and phoneme sequences are used in that human language, such as French, to an occurrence of other phoneme and phoneme sequences in that human language, and 2) how often particular phonemes and phoneme sequences are used in that human language, such as French, to an occurrence of the same or very similar sounding phonemes and phoneme sequences are used in another human language, such as English.

As discussed, the run-time language identifier module 218 cooperating with the bank of statistical language models using the filled databases 216 observes enough phoneme sequences that correspond to the spoken audio that the run-time language identifier module 218 should be able to identify the spoken language by utilizing these statistical models 216.

The language ID trainer module 114 analyzes the training speech audio data for each language, and language ID parameter databases 116 for one or more statistical language models are populated. Each of these language ID parameter databases 116 for one or more statistical language models are intended to represent some set of language-dependent, fundamental characteristics of the training speech that can be used in the second (recognition) phase of the identification process. During the training phase, the set of language ID parameters for each language in the set of languages are trained separately.

The language ID parameters database 116 is trained/filled with phoneme sequences for each spoken language. Sequences of phonemes unique to one or a few languages are identified. Phonemes patterns common to many different languages are also identified. The set of phonemes unique to one or a few languages may include phonemes and phoneme sequences that occur essentially only in those one or few languages as well as phonemes and phoneme sequences that occur common to many languages but occur so commonly in those one or few languages that a high count of those phoneme or phoneme sequences occurrence is also a good indication that particular language is being spoken in the audio file under analysis.

As discussed, the statistical models 216 need training so there is a training phase in the design of the system to fill the databases 116 on a per human language basis. Each time the databases 116 being trained on one of the set of human languages receive the phone output from the same universal phoneme decoder 112 independent of which human language basis is being trained on. Thus, the same universal phoneme decoder 112 identifies the most likely phoneme sequence in the audio stream for each of the languages being trained on. The language ID trainer 114 puts phones and phone sequences into a language ID parameter database 116 for that spoken language being trained on. Each statistical model 216 has its own spoken language specific database full of phones and phone sequences for that spoken language. Each statistical model analyzes an amount of different phones and phone sequences that occur in a training audio data and counts of a total number of phonemes for the training audio data upon which the model is based on. A statistical inference methodology uses the extracted phoneme sequence to do the language identification. The statistical model uses the linguistic features including the set of unique phoneme patterns to distinguish between spoken human languages. The statistical model may use Phonotactics are the language-dependent set of rules specifying which phonemes are allowed to follow other phonemes. Each statistical language model 216 couples to the run-time language identification 218. Each statistical language model 216 provides probability estimates of how linguistically likely a sequence of linguistic items are to occur in that sequence based on an amount of times the sequence of linguistic items occurs in text and phrases in general use in that spoken language. Assuming an example trigram language model where the Ngram sequence is three linguistic items, when queried with a context of phones xy and a phone z that may immediately follow that context, the statistical language model 208 can return an estimate P(z|xy) of the probability that z does follow xy in a given language. The statistical language model 216 provides probability estimates P(z|xy) for how linguistic likely the given sequence of phones xyz come from one of the set of spoken languages. The statistical language model then provides probability estimates P(z|xy) of how likely it is that specific phoneme z (or other linguistic units such as a words or phone sequences) also comes from one of the set of spoken languages based on the number of times those phone sequences and others occur in the audio files on which the model has been trained. The statistical language model 216 supplies to the language identifier module 218 probabilities of how linguistically likely a particular uttered phoneme comes from a particular spoken language based on an identified sequence of a phonemes.

The human language specific database 116 couples to the language ID trainer module 114. The human language specific database 116 acts as a repository to store language ID parameters including all special N-grams, sequences of linguistic items, that have significantly different counts/occurrences in the corpus of human language specific acoustic data analyzed than would be expected compared to other languages. The special N-grams (for example xyz) are linguistic items in that sequence and are stored along with the actual counts of the number of times that N-gram appeared in the corpus of human language specific acoustic data analyzed.

The language ID parameters database 116 couples to the run-time language identifier module 218. The language ID parameters database 116 is a populated database specific to a linguistic domain that contains at least the number of counts that the sequence of phones x followed by y occurs in the overall corpus of human language specific acoustic data analyzed from this domain analyzed C(xy), as well as the number of counts C(xyz) the N-grams (xyz), phone sequences of x followed by y followed by z, occurs in the overall corpus of domain-specific acoustic data from this analyzed domain. The language ID parameters database 116 returns the linguistic sequences of xy, the N-gram (xyz), and the observed counts of both C(xy) and C(xyz) in the corpus of human language specific acoustic data analyzed when requested by the run-time language ID module 218. The linguistic sequences and the associated count data created from the analysis is stored in the language ID parameters database 116 to form a language ID parameters database 116 of N-grams for a specific domain. Depending on size requirements, the language ID parameters database 116 and the other databases described below may each be implemented as simple in-memory lookup tables, as relational databases on disk, or with any other standard technology.

The set of languages trained on as discussed above may be two or more. However, more typically the set of languages for which the universal phoneme decoder contains a universal phoneme set representing phonemes occurring in the set of languages will be five or more languages. Thus, the set of language will be five or more languages.

Figure 2:
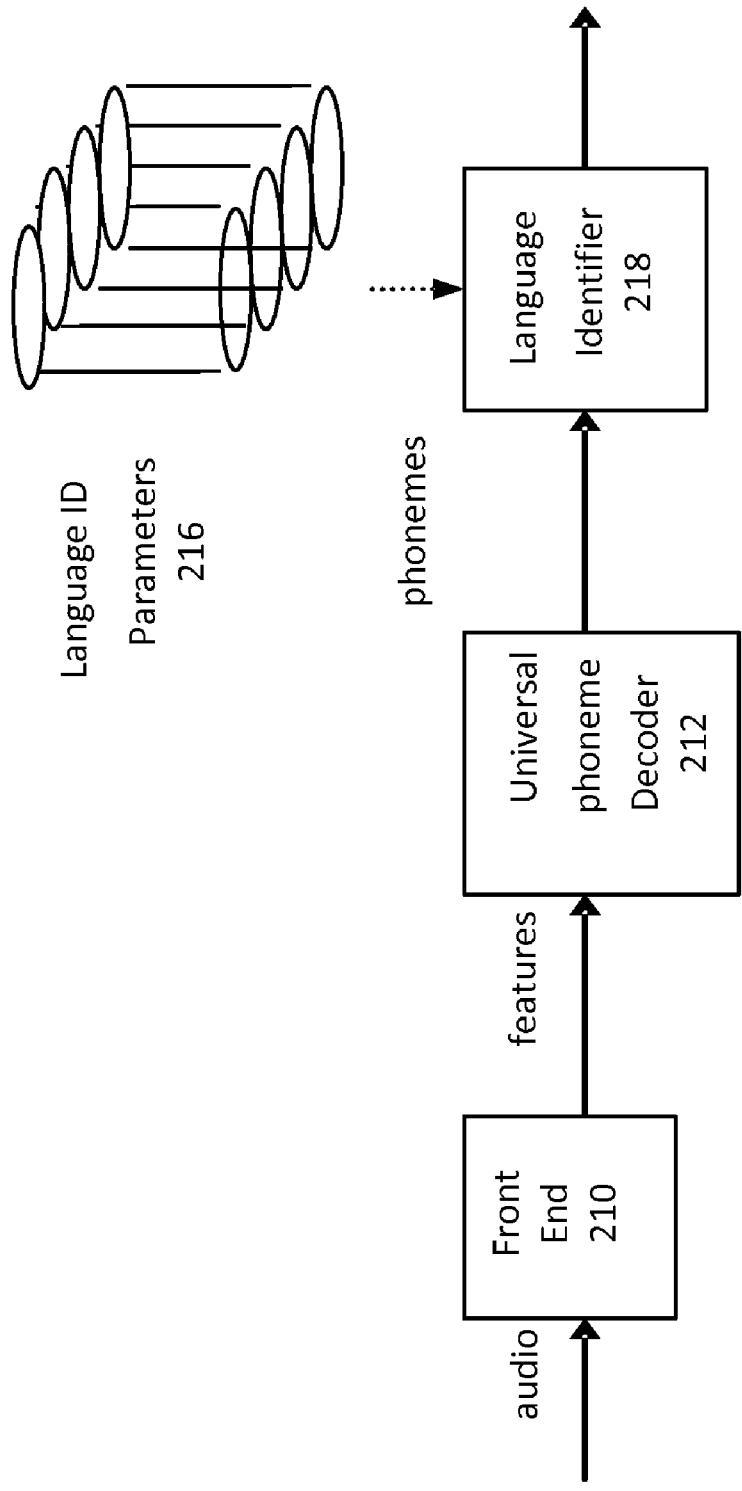
FIG. 2 illustrates a block diagram of a language identification engine in a run-time recognition phase.

FIG. 2 illustrates a block diagram of a language identification engine in a run-time recognition phase. During the run-time language identification phase, the language ID parameters for each language to be identified are loaded into the run-time language identifier module 218. During the identification phase, a new utterance is compared to each of the language-dependent models 216, and the likelihood that the language of the utterance matches the languages used to train the models is calculated by the run-time language identifier module 218. The language-dependent statistical language model 216 most likely to be correct is then selected by the run-time language identifier module 218. The universal phoneme decoder 212 is used to identify the phones in the audio data covering a set of two or more possible languages to be identified.

The identification process may be as follows:

1) The front-end 210 converts the received audio stream into time coded feature frames for language identification, as discussed above for the training phase.

2) A universal phoneme decoder 212 recognizes the feature frames as a sequence of phonemes, together with start/end time associated with each feature frame, as discussed above for the training phase. The universal phoneme detector 212 is configured to identify all of the phonemes uttered in each of the set of languages to be identified.

3) The run-time language identifier module 218 receives the phoneme sequence from the universal phoneme decoder 212 in the time coded feature frames and determines the most probable spoken language based on the language identifying algorithm making use of the set of unique phoneme patterns to a given spoken language verses the common phoneme sequences across the different languages. As discussed above, the unique set of phoneme patterns includes phonemes and phonemes sequences unique to various languages in the set of languages, some phonemes and phonemes sequences statistically uncommon to various languages in the set of languages but have another linguistic factor to make them statistically relevant, and some phonemes and phonemes sequences that are statistically common to various languages in the set of languages but because of the occurrence rate of those phonemes and phonemes sequences being statistically different in a particular language and when that occurrence rate is compared to the sequences of phonemes being analyzed, then those common phonemes and phonemes sequences are very indicative a particular language being spoken. The run-time language identification module 218 is configured to attempt to automatically identify the spoken language from a set of two or more potential languages based on phoneme sequence patterns.

As discussed, a threshold value (t) may be established to set a significant statistical amount of occurrence of similar phone and phone sequences between spoken languages to become part of the set of unique phoneme patterns to a given spoken language. The amount can be set by a user and derived through a sequence of steps and essentially determines whether the statistical language models are consistent or not with the evidence available to the correction module. Thus, the threshold value (t) can be an established criterion that may include a sequence of steps (perhaps) based on a statistical test to create the threshold value (t). In an embodiment, the threshold value (t) is derived from being discrepant with the counts of the items concerned observed in a corpus representative of the domain, where the definition of 'discrepant' is a matter of implementation, but will usually involve the use of a statistical test of the likelihood of those counts given the general model's probability estimate. When a significant statistical amount of occurrence of similar phone and phone sequences occurs, then the determination of which language is being spoken may occur on a much faster basis.

4) The language identification algorithm in the run-time language identifier module 218 may be a second order discrete Markov model with a dialogue structure and branch logic. The language identification algorithm in the run-time language identifier module 218 uses the second order Markov Model algorithm based on phoneme sequences. Recognition involves tokenizing the audio data, and calculating the likelihood that its phone sequence was produced in each of the languages. Again, the language yielding the highest likelihood is identified and selected. The language may be identified using the set of unique phoneme patterns in a single recognition pass through the system. Because the phonemes are time annotated in a coded file, the results of the language identification algorithm allows the user to automatically identify sections of audio as belonging to a particular spoken language and annotate where in the audio file these transitions occur. The language identification algorithm is also more robust to environmental conditions. The language ID model herein may be a multilingual speech recognition system, where multiple languages are being spoken in the same audio data being analyzed.

Figure 3:
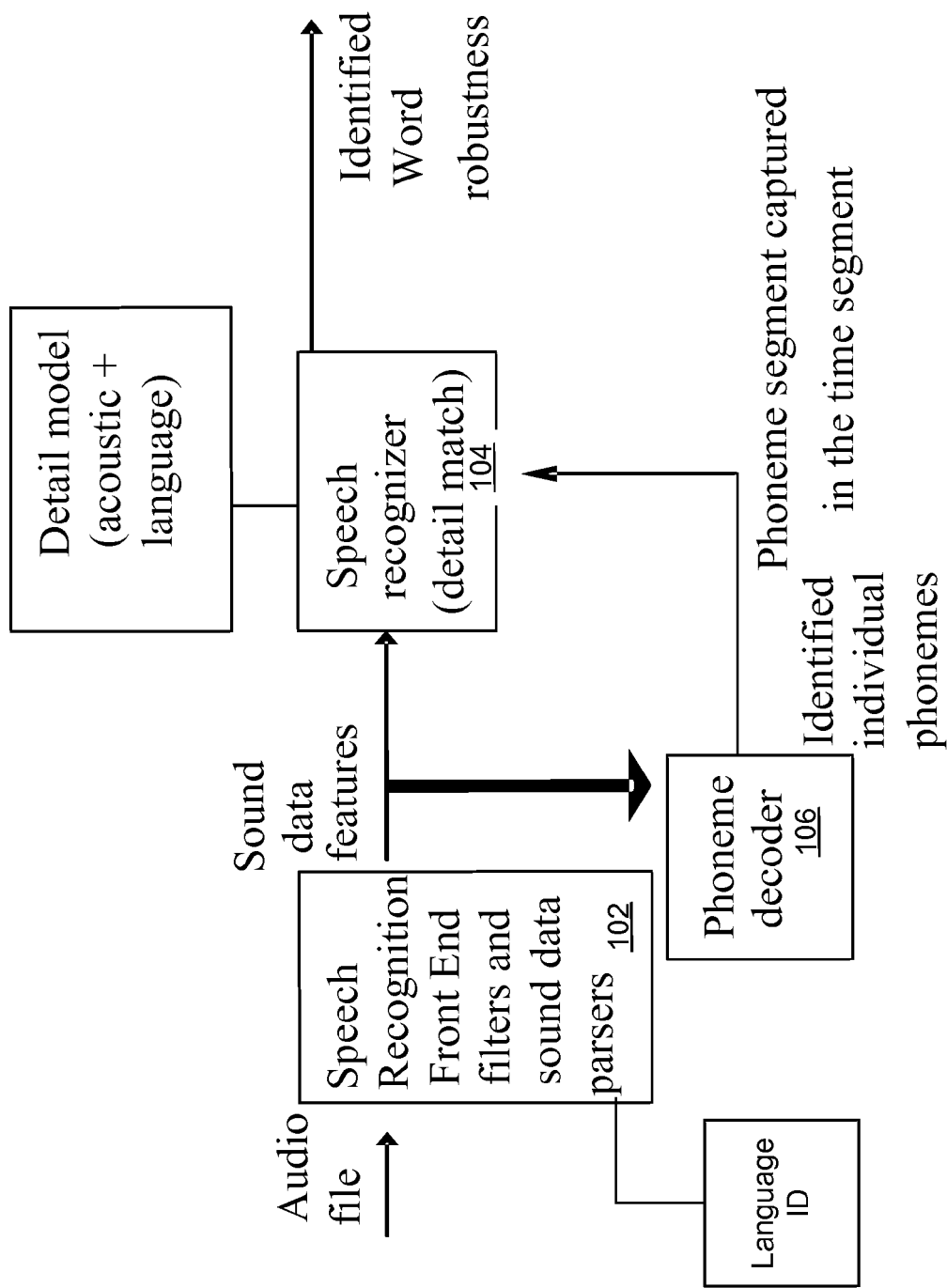
FIG. 3 illustrates a block diagram of a continuous speech recognition engine.

FIG. 3 illustrates a block diagram of a continuous speech recognition engine. The continuous speech recognition engine 100 at least includes front-end filters and phoneme decoder 102, a speech recognition decoder module 104, general-corpus statistical language model 108, a run-time correction module 106, an output module of the speech recognition system 110, and a user interface 112.

In an embodiment, the parts of the speech recognition system operate similar to the already described language identification system.

The speech recognition decoder module 104 receives the time-coded sequence of sound feature frames from the front-end filters 102 as an input. The speech recognition decoder module 104 applies a speech recognition processes to the sound feature frames. The speech recognition decoder module 104 recognizes the sound feature frames as a word in a particular human language and sub dialect of that human language. The speech recognition decoder module 104 then associates these language parameters with the recognized word, together with a start and end time as the recognized word outputted from the speech recognition decoder module 104. The speech recognition decoder module 104 determines at least one or more best guesses at each recognizable word that corresponds to the sequence of sound feature frames. The speech recognition decoder module 104 supplies the one or more best guesses at the identified word resulting from the speech recognition process to the general-corpus statistical language model 108 via a run-time correction module 106.

In an embodiment, the speech recognition decoder module 104 may be any standard speech recognition tool that outputs its one or more best guesses as an identified/recognized word that corresponds to the word uttered in the audio file. The speech recognizer decoder module 104 may be a complete speech recognition tool that includes a mixture Gaussian distributions of context clustered triphones, with statistical language models, and a Viterbi algorithm and/or use a Hidden Markov Model and neural networks.

The output module of the speech recognition system 110 is configured to provide a representation of what uttered sounds and words were inputted into the speech recognition system based on the domain corrected probability estimates.

Overview of Another Example Embodiment

Figure 4:
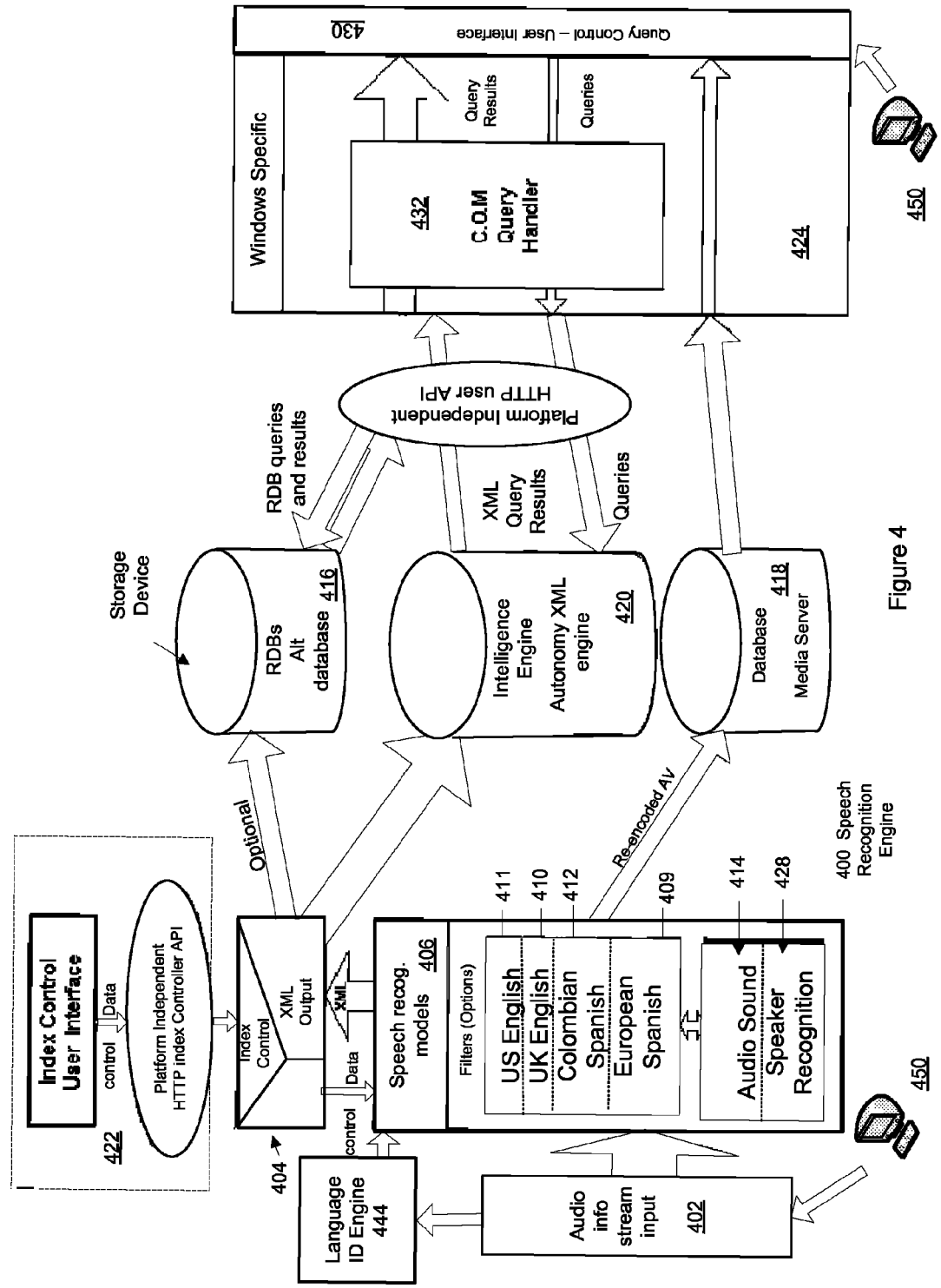
FIG. 4 illustrates an embodiment of a continuous speech recognition engine with a language identification engine that improves an accuracy of probability estimates.

FIG. 4 illustrates an embodiment of a continuous speech recognition engine with a language identification engine that improves an accuracy of probability estimates. In an embodiment, the continuous speech recognition engine 400 may include one or more inputs 402 for information streams, an index control module 404, a continuous speech recognition engine including a correction module and a decoder module 406, one or more attribute filters 408, 409, 410, 412, 414 in the a decoder module 406, storage devices such as a rational data base 416 and an audio-visual media server 418, an intelligence engine 420, a triggering and synchronization module 422 including an index control user interface, and a manipulation module 424 including a query control user interface 430. The continuous speech recognition engine 400 cooperates with the language identification engine 444. The language identification engine 444 is hosted on a server and operates as described above.

The continuous speech recognition engine 400 can be used by a user from a client machine 450 supplying audio files, including audio visual files, from the client machine 450 over a wide area network, such as the Internet, to a server hosting the continuous speech recognition engine 400 with the robustness measure system. Examples of continuous voice communications are audio files of phone conversations, audio files of radio and television shows, and other continuous flowing spoken words files. In continuous voice communications, two separate words may be uttered as close enough in time to confusion a recognition system into having decide whether a single word or two discrete words where in fact uttered. The continuous speech recognition engine 400 automatically identifies the spoken language in, for example, a phone call and then accurately recognizes the words being spoken with one of the language specific continuous speech recognition modules 408-412. The continuous speech recognition engine 400 also automatically identifies the spoken language of a media file and categorizes them.

Overall, in an embodiment, one or more streams of audio information pass through the continuous speech recognition module 406 discussed above. The recognition modules 406 couples to the index control module 404. The index control 404 sends data corresponding to attributes of the information stream passing through the continuous speech module 406 indexes all of the data from the continuous speech recognition module 406. The index control module 404 then may send the indexed data to a storage device 416 as well as the intelligence engine 420. The manipulation module 424 contains a graphic user interface 430 to allow a user to manipulate the indexed data. The triggering and synchronization module 422 allows the user to program events to occur automatically based upon the indexed data passing through the index control module 404.

In an embodiment, the continuous speech recognition engine 400 may have one or more information stream inputs 402 into the continuous speech recognition module 406. In an embodiment, at least one of the information stream inputs 402 includes audio-visual data.

The continuous speech recognition module 406 with the corrected probability estimates translate the supplied audio and create a time coded text file, where each transcribed word has the robust confidence level parameter as a measure of how confident the system is that the word was correctly identified. Each word in the supplied audio file is stored in a memory with a robust confidence level parameter and the start and stop time codes from the common time line. The engine may perform this function on other linguistic items including phoneme and phoneme sequences.

Accordingly, the user interface 430 may supply a transcript of recognized words in which those recognized words below a threshold robust confidence level are indicated in the transcript. The intelligence engine 420 may assign a higher weight to recognized words with a robust confidence level above a threshold than recognized words below the threshold, and use the weight for the recognized words when queries are made with the user interface 430. The user interface 430 is configured to allow a speech data analytics on each word in the supplied audio file 402 stored in the memory based on the robust confidence level parameter.

For example, a user from a client machine 450 may then supply to the user interface 430 query words of interest to find out if the supplied audio file 402 contains any of the query words. The intelligence engine 430 identifies recognized words below a certain robust confidence level to be filtered out from the query or just placed in a hierarchical rank list at the bottom of the ranked list due to the weighting associated with the recognized words below a certain robust confidence level. The user may then activate/click a link to the returned time segments containing those recognized words matching the query words and listen to a segment of the audio file pertinent to when those words are spoken in the supplied audio file 402.

Similarly, the continuous speech recognition engine 400, which may be resident on the server, can also monitor call center audio conversations and identify when certain words of interest are spoken with the triggering and synchronization module 422. The triggering and synchronization module 422 then directs a user on the client machine 450 to the time segment containing those words matching the trigger words and allow the user to listen to a segment of the audio file pertinent to when those trigger words are spoken in the supplied audio file. The triggering and synchronization module 422 may send an event notification to the client machine 450 over the network so the user on the client machine 450 can activate/click on the notification to allow the user to listen to the segment of the audio file pertinent to when those trigger words are spoken in the supplied audio file 402.

The continuous speech recognition module 406 cooperates with various human language models 408, 410, 412, and 414, which the correction module adapts to those domains. For example, an embodiment may contain attribute filters including a various human language models including United States English 408, United Kingdom English 410, European Spanish 409, Colombian Spanish 412, and an audio sound attribute filter 414. In an embodiment, the one or more attribute filters 408, 409, 410, 412, 414 may identify attributes from each stream of information. The identified attributes may be a human language type, a change in human language type being spoken, a human accent, a change in human accent being spoken, speaker's individual voice characteristic, a change of speaker, discrete spoken words, individual written words, and other similar characteristics. The different human language models are compared at approximately the same time to generate a robust confidence rating for each recognized phoneme.

Figure 5:
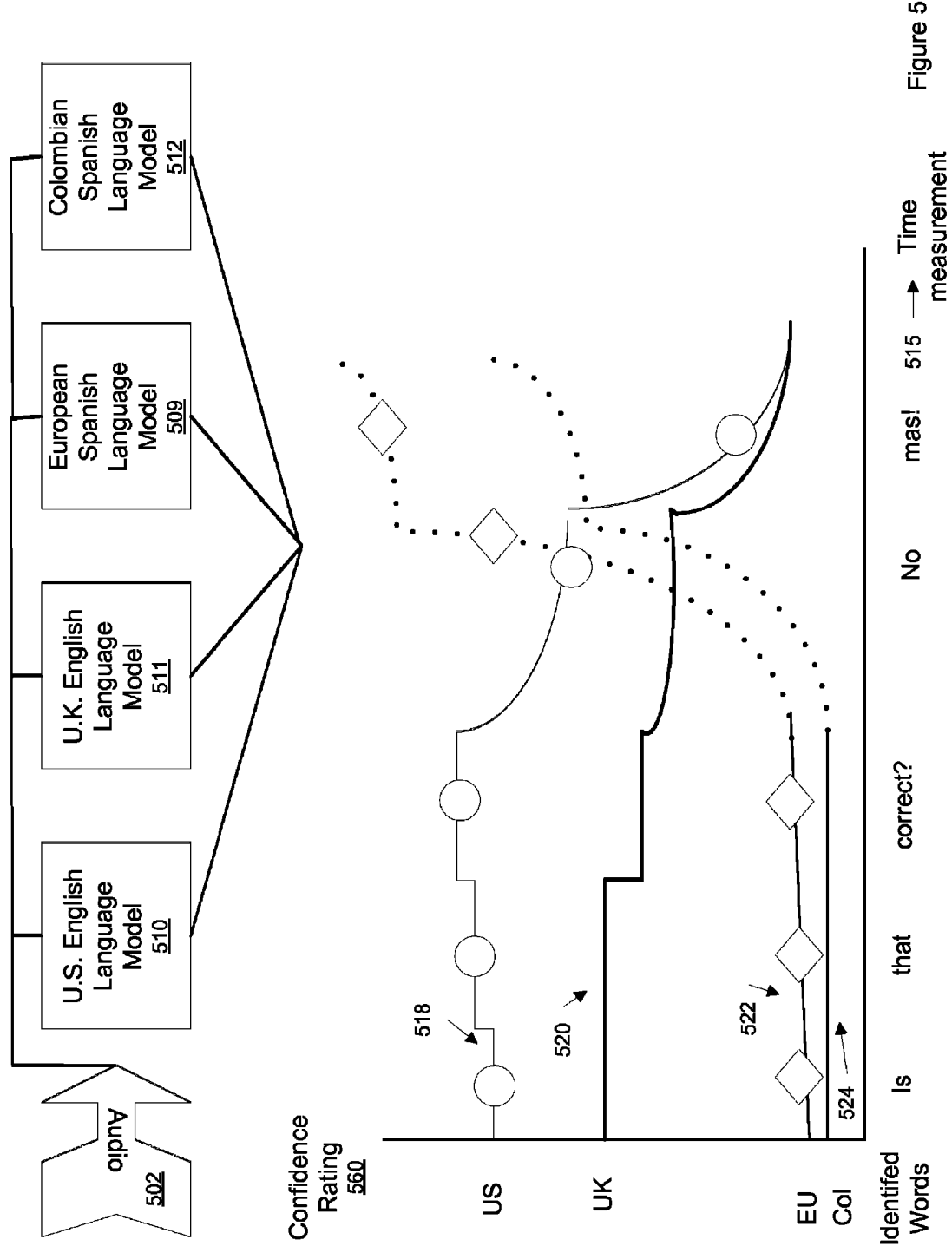
FIG. 5 illustrates a graph of the continuous speech recognition engine monitoring and transcribing the phone conversation.

In an embodiment, a human language and accent attribute filter consists of four language models 409-412 receive the audio information stream 402 to compare the output from the different human language models 409-412 at approximately the same time to generate a robust confidence rating for each recognized word. The four exemplary human language models are a U.S. English language model 410, a U.K. English language model 411, European Spanish language model 408, and a Colombian Spanish language model 412. The human language models 409-412 may be resident on the same machine or networked across multiple machines. The audio information stream 402 may be originally from an unstructured source such as phone conversation. The exemplary audio information stream 402 is phone conversation between two unknown speakers. FIG. 5 illustrates a graph of the continuous speech recognition engine monitoring and transcribing the phone conversation. In U.S. English, a first speaker states the words, "Is that correct." In European Spanish, a second speaker responds with the words, "No mas!"

The engine generates a confidence rating 560 from each language model 509-512 for each spoken word over time. In an embodiment, each language model 509-512 generates a confidence factor in the accuracy of each spoken word. For the spoken word "Is" both the U.S. English language model 510 and the U.K. English language model 511 have high confidence factors 518, 520 in identifying the spoken word; however, because of the phonetic emphasis during the pronunciation of the word, "Is" the U.S. English language model 510 generates a higher confidence rating 518. In an embodiment, a comparison between similar language models may be used to determine the accent of the speaker. The European Spanish language model 509 and the Colombian Spanish language model 512 generate a very low confidence rating 522, 524 in the accuracy of identifying the word "Is" because that phonetic sound doesn't equate to an actual word in the Spanish language. The four language models 510, 511, 509, 512 continue detecting and identifying the spoken words "That" and "Correct?" and due to the individual speaker characteristics assign various confidence ratings to the identified words.

A speaker change occurs. A significant change in the value of the confidence rating of a particular language model can be detected. Further, the attribute filter may detect and log a crossover of confidence ratings between the confidence rating from a first language model that was higher and is now lower than a confidence rating from a second language model. The attribute filter may make use of all the captured data to determine if a speaker change occurs such as pauses, confidence rating crossovers, significant changes in the value of the confidence rating.

The second speaker states "No mas!" The four language models 510, 511, 509, 512 generate medium confidence ratings 518, 520, 522, 524 on the accuracy of the spoken word "No" because the word "No" has a meaning and therefore is recognized in all four language models 510, 511, 509, 512. However, the European Spanish language model 509 generates the highest confidence rating 522 due to the phonetic emphasis during the pronunciation of the word, "No." In an embodiment, a moving time frame window may be employed to capture the confidence factors of words spoken in the same sentence or context as the identified word in order to influence the confidence factor assigned to the identified word. When the Spanish spoken word "mas" is pronounced, then the confidence ratings of the English language models 518, 520 lower and the confidence rating of the European Spanish language model 522 due to the accent increases to again be the highest confidence rating. The captured data may be used to generate an accurate transcript of the conversation.

Further, the captured data may be used to identify the unique voice characteristics of the first speaker and second speaker. For example, the first speaker may possess the unique voice characteristics of speaking English with a U.S. accent as well as when the speaker annunciates "Correct?" the confidence rating of a U.S. English language model 518 and European Spanish language model 522 increase while the confidence rating of a UK English language model 520 lowers. In an embodiment, the one or more attribute filters generate a time coded recognized word with a corresponding robust confidence rating in real time. Thus, a triggering and synchronization module may generate an event, such as an alarm, when an attribute filter detects a recognized word on a watch list.

Referring back to FIG. 4, for each recognized word, the attribute filter generates an individual XML document including as elements the identified word, the confidence rating from each language model, and the time code for that word. The transcript of the entire supplied audio file corresponds with an overall XML document for that conversation. However, because each word is a discrete XML document itself within the aggregate XML document, then a user may select a phrase or portion within the transcript and start playing the audio segment from that exact moment in time corresponding to the selected phrase.

The manipulation-module 424 interacts with the storage devices 416 and the intelligence engine 420 to allow a user to navigate and utilize an indexed stream of recognized words. Transmodal manipulations of each type of attribute may occur due to the recognized words organized through a time ordered index. A user from a client machine 450 through the user interface 430 may perform operations on a first set of attributes in order to manipulate a second set of attributes.

For example, a user may create a new audio clip of a desired segment of a radio broadcast by highlighting the transcript text and cutting the transcript text from the text document. Further, the user may splice multiple video clips together by assembling and inserting text corresponding to each video clip. Thus, the user manipulates a first type of attribute such as the transcribed text in order to perform an operation on the second type of attribute such as spoken words or video characteristics.

Also the continuous speech recognition engine 400 may be used to analyze a live audio feed. While a live feed is being broadcast, the language identification engine of the continuous speech recognition engine 400 may receive the audio stream for analysis from a live audio source. Live broadcast typically have a five to ten second delay between being recorded to being broadcast.

The continuous speech recognition engine 400 identifies each phoneme with the universal phoneme decoder to identify the language being spoken from an audio stream of a live broadcast as well as detecting and identifying a new language being spoken within the same audio stream, supplying the identified language and identified phonemes to a speech recognition module, and subsequently identifying each word in the identified language with the speech recognition module from the audio stream of the live broadcast.

The continuous speech recognition engine 400 encodes each of the identified phonemes and identified words from the audio stream of the live broadcast.

The continuous speech recognition engine 400 assigns a time indication with each of the identified words, where each of the identified words shares a common time reference such as frame numbers or milliseconds into the broadcast.

The continuous speech recognition engine 400 generating a synchronized link to relevant material based on the content of the live broadcast, the synchronized link to be displayed with the live broadcast. The continuous speech recognition engine 400 synchronizes the synchronized link to appear at approximately an utterance of the most relevant word related to the content of the live broadcast. The link to relevant material based is generated upon the one or more words being spoken and synchronizing a display of the link in less than ten seconds from analyzing the audio stream of the live broadcast.

In natural language and Boolean language queries, the intelligence engine 420 queries a natural language and/or Boolean language query from the manipulation-module 424 against any part of the XML documents stored in the storage, within the intelligence engine 420, and/or storage devices 416 external to the system such as the Internet. The intelligence engine 420 also can be queried to provide suggestions of similar content. Thus, for example, a user may remember three key words about a video segment of information that the user is trying to locate. The user may submit the query through the query control user interface 430 and view the resulting video segments that match the query results on in the display window 444.

In concept matching, the intelligence engine 420 accepts a piece of content or reference (identifier) as an input and returns references to conceptually related items ranked by relevance, or contextual distance. This may be used to generate automatic hyperlinks between pieces of content. Thus, while a live feed is being broadcast, the triggering and synchronization module may display hyperlinks to related documents to the topic which the speaker is talking about based upon concept matching to the indexed transcript correlating to the video segment.

In agent creation, the intelligence engine 420 accepts a piece of content and returns an encoded representation of the concepts, including each concept's specific underlying patterns of terms and associated probabilistic ratings. In agent retraining, the intelligence engine 420 accepts an agent and a piece of content and adapts the agent using the content. In agent matching, the intelligence engine 420 accepts an agent and returns similar agents ranked by conceptual similarity. This may be used to discover users with similar interests, or find experts in a field. This may also be used to identify a particular speaker even though continuous speech recognition engine 400 has no previous knowledge of that speaker.

The robust confidence level assigned to each recognized word outputted from the continuous speech recognition engine 400 may be used in all sort of speech to text applications. Words below a certain robust confidence level may be filtered out from the query or just place in a hierarchical rank list at the bottom, and identified words with a high robust confidence level would be at the top of the hierarchical rank list of matching words to the query. This hierarchical ranked list based on robust confidence level in effect creates a pre-filter for the user making the query by ranking the more likely less relevant corresponding matches at the bottom of the list and the more likely relevant matches with the higher weighed values at the top of this list reported back to the user. The continuous speech recognition engine 400 allows the user to prioritize and moderate the search results based on robustness. The continuous speech recognition engine 400 allows different weightings to be applied to words based on robustness ratings during speech data analytics. The robustness rating may be used as a measure of how usable/reliable each word produced is.

The computing system environment 400 where a server hosts the continuous speech recognition engine is only one example of a suitable computing environment and is not intended to suggest any limitation as to the scope of use or functionality of the invention. The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The continuous speech engine may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below. In general, the program modules may be implemented as software instructions, Logic blocks of electronic hardware, and a combination of both. The software portion may be stored on a machine-readable medium and written in any number of programming languages such as C+, XML, HTML, etc. Therefore, the component parts, such as the decoder module 106, etc. may be fabricated exclusively of hardware logic, hardware logic interacting with software, or solely software.

A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown, the invention is not to be limited to these embodiments. The invention is to be understood as not limited by the specific embodiments described herein, but only by scope of the appended claims.

What is claimed is:

1. A language identification engine, comprising:
a front end module having an input configured to receive an audio stream that includes a spoken language that corresponds to at least one of a set of two or more candidate languages being spoken in the audio stream under analysis;
a universal phoneme decoder that contains a universal phoneme set that 1) represents all phonemes occurring in the set of two or more candidate languages, and 2) captures phoneme correspondences across languages, such that a set of unique phoneme patterns and probabilities are calculated in order to identify a most likely phoneme occurring each time in the audio stream in the set of two or more candidate languages;
one or more statistical language models having logic configured to supply to a run-time language identifier module probabilities of how linguistically likely a particular uttered phoneme identified by the universal phoneme decoder comes from a particular candidate language based on an identified sequence of phonemes, wherein each statistical language model uses linguistic features from the identified phonemes from the universal phoneme decoder including the set of unique phoneme patterns created for each language in the set to distinguish between spoken human languages in the set of two or more candidate languages;
a bank of two or more human language specific databases for the one or more statistical language models to reference, wherein the databases are pre-filled with phoneme and phoneme sequences for a particular language in the set of two or more candidate languages, and each of the human language specific databases received the phoneme and phoneme sequences from a phoneme output from the universal phoneme decoder independent of which spoken language in the set of two or more candidate languages was being trained on;
wherein the run-time language identifier module identifies a particular human language being spoken in the received audio stream from the set of two or more candidate languages by utilizing the one or more statistical language models; and
wherein the modules making up the language identification engine are implemented in logic blocks of electronic hardware, software coding, and any combination of the two, where portions implemented in software coding are stored in an executable format by a processor on a non-transitory machine-readable medium.

2. The language identification engine of claim 1, wherein the run-time language identifier module queries the one or more statistical language models cooperating with the human language specific databases filled in the training process to observe enough phoneme sequences that correspond to spoken audio so that the run-time language identifier is able to identify the candidate language by utilizing the one or more statistical models, and the training on each human language occurred one language at time to fill each corresponding human language specific database to maximize an accuracy of both a per-language recognition accuracy in identifying a correct phoneme being spoken in that language as well as a language identification process of which candidate language is being spoken; and wherein the logic block of electronic hardware includes the processor and a memory.

3. The language identification engine of claim 1, wherein the universal phoneme decoder during a training phase identifies the most likely phoneme sequence in the audio stream for each of the languages being trained on, a language ID trainer puts phones and phone sequences into its own associated human language specific database for that spoken language being trained on, and the phone output of the phoneme decoder supplies each identified phoneme in the series of identified phonemes to an input of the language ID trainer.

4. The language identification engine of claim 1, wherein the universal phoneme decoder during the training phase converted uttered sounds in supplied audio training data into identified phonemes in each candidate language, a language ID trainer coupled to the universal phoneme decoder analyzed the resulting phonemes and the phoneme sequences, and then the language ID trainer filled the human language specific databases for the one or more statistical language models for each candidate language on a per language basis.

5. The language identification engine of claim 1, wherein the statistical language models accumulate a set of n-gram sequences of phonemes histograms, one per language, in an assumption that different languages will have different n-gram histograms, and a language ID trainer then approximates the n-gram distribution as the weighted sum of the probabilities of the n-gram sequence of phonemes and supplies this back to the statistical language model for that language.

6. The language identification engine of claim 1, wherein the statistical language model compares both a ratios of counts of phone sequences observed in an audio training data compared to 1) how often particular phonemes and phoneme sequences are used in a first human language to an occurrence of other phoneme and phoneme sequences in the first human language, and 2) how often particular phonemes and phoneme sequences are used in the first human language to an occurrence of the same or very similar sounding phonemes and phoneme sequences are used in a second human language.

7. The language identification engine of claim 1, wherein the universal phoneme set includes unique phonemes and/or phoneme sequences that only occur in one or a few languages, and on the other end of the spectrum, the unique phoneme and/or phoneme sequence occurs with such a high occurrence rate in a particular language compared to other languages in the set that the occurrence of this phoneme and/or phoneme sequence accompanied by multiple occurrences of this phoneme occurring within a short set time period is also a good indicator at identifying that a particular language is being spoken.

8. The language identification engine of claim 1, wherein the identified phonemes and the phoneme sequences from the language ID trainer in the training phase are modeled in the one or more statistical language models using discrete Markov models (HMMs) and a same universal phoneme decoder was applied to each candidate language in the set of languages, as opposed to a phoneme decoder being specifically trained to the candidate language being tested, which now allows a more consistent output from the universal phoneme decoder for the received audio stream.

9. The language identification engine of claim 1, wherein each statistical model has its own human language specific database full of phones and phone sequences for that spoken language, each statistical model analyzes an amount of different phones and phone sequences that occur in a training audio data and counts of a total number of phonemes for the training audio data upon which the model is based on, each statistical language model uses the linguistic features including the set of unique phoneme patterns to distinguish between spoken human languages, each statistical language model couples to the run-time language identification and supplies to the language identifier module probabilities of how linguistically likely a particular uttered phoneme comes from a particular spoken language based on the identified sequence of a phonemes.

10. The language identification engine of claim 1, wherein each human language specific database couples to a language ID trainer module, each human language specific database acts as a repository for that language to store language ID parameters including all special N-grams, sequences of linguistic items, that have significantly different counts/occurrences in a corpus of human language specific acoustic data analyzed than would be expected compared to other languages, and the special N-grams are stored along with an actual counts of the number of times that N-gram appeared in the corpus of human language specific acoustic data analyzed, and a first human language specific database during run time couples to a first statistical language model.

11. The language identification engine of claim 1, wherein during the run-time language identification phase, language ID parameters for each language to be identified are loaded into the run-time language identifier module, a new utterance is compared to each of the language-dependent statistical models, and the likelihood that the language of the utterance matches the languages used to train the models is calculated by the run-time language identifier module, and a language-dependent statistical language model determined by the run-time language identifier module most likely to be correct is then selected by the run-time language identifier module.

12. The language identification engine of claim 1, wherein the front-end converts the received audio stream into time coded feature frames for language identification and the universal phoneme decoder recognizes the feature frames as a sequence of phonemes, together with start/end time associated with each feature frame, and the universal phoneme detector is configured to identify all of the phonemes uttered in each of the set of languages to be identified, and the run-time language identifier module receives the phoneme sequence from the universal phoneme decoder in the time coded feature frames and determines a most probable candidate language based on the language identifying algorithm making use of the set of unique phoneme patterns to a given spoken language verses the common phoneme sequences across the different languages.

13. A continuous speech recognition engine hosted on a server cooperating with a language identification engine that improves an accuracy of probability estimates, comprising:
an input to receive supplied audio files from a client machine over a wide area network to the server hosting the continuous speech recognition engine;
a user interface to the continuous speech recognition engine; and
a language identification engine, wherein the continuous speech recognition engine receives an input from the language identification engine to identify the human language being spoken in the received audio files; wherein the language identification engine at least includes
a front end module having an input configured to receive an audio files consisting of a spoken language of at least one of a set of two or more potential languages being spoken in the audio files under analysis,
a universal phoneme decoder that contains a universal phoneme set representing both 1) all phonemes occurring in the set of two or more spoken languages, and 2) captures phoneme correspondences across languages, such that a set of unique phoneme patterns and probabilities are calculated in order to identify a most likely phoneme occurring each time in the audio files in the set of two or more potential languages in which the universal phoneme decoder was trained on, one or more statistical language models having logic configured to supply to a run-time language identifier module probabilities of how linguistically likely a particular uttered phoneme identified by the universal phoneme decoder comes from a particular spoken language based on an identified sequence of phonemes, wherein each statistical language model uses linguistic features from the identified phonemes from the universal phoneme decoder including the set of unique phoneme patterns created for each language in the set to distinguish between spoken human languages in the set of two or more spoken languages, a bank of human language specific databases for the one or more statistical language models to reference, where of the databases were filled with phoneme and phoneme sequences being trained on for a particular language in the set of two or more spoken languages, and each of the human language specific databases received the phoneme and phoneme sequences from a phoneme output from the same universal phoneme decoder independent of which spoken language in the set of two or more potential languages was being trained on, and the run-time language identifier module identifies a particular human language being spoken in the received audio files in the set of two or more potential languages by utilizing the linguistic probabilities supplied by the one or more statistical language models that are based on the set of unique phoneme patterns created for each language, wherein the modules making up the language identification engine are implemented in logic blocks of electronic hardware, software coding, and any combination of the two, where portions implemented in software coding are stored on a non-transitory machine-readable medium.

14. The continuous speech recognition engine hosted on the server of claim 13, wherein a language identification algorithm in the run-time language identifier module is a second order discrete Markov model with a dialogue structure and branch logic and the language identification algorithm in the run-time language identifier module uses the second order Markov Model algorithm based on the set of unique phoneme and phoneme sequences, and recognition involves tokenizing the audio file, and calculating a likelihood that its phone sequence was produced in each of the languages in the set, and the language is identified using the set of unique phoneme patterns in a single recognition pass through the system.

15. The continuous speech recognition engine hosted on the server of claim 13, further comprising another input to receive query words of interest from a user of the client machine to the user interface to find out if the received audio file contains any of the query words, and an intelligence engine identifies recognized words from the query and returns a hierarchical rank list of recognized words, and the user then activates a link to the returned time segments in the received audio files containing those recognized words matching the query words and listen to a segment of the audio files pertinent to when those words are spoken in the received audio files.

16. The continuous speech recognition engine hosted on the server of claim 13, further comprising:

a triggering and synchronization module of the continuous speech recognition engine that analyzes call center audio conversations and identifies when certain words of interest are spoken with the triggering and synchronization module, wherein the triggering and synchronization module then directs a user on the client machine to the time segment containing those words matching the trigger words and allows the user to listen to a segment of the audio files pertinent to when those trigger words are spoken in the supplied audio files.

17. The continuous speech recognition engine hosted on the server of claim 16, wherein the triggering and synchronization module sends an event notification to the client machine over the network so the user on the client machine can activate/click on the notification to allow the user to listen to a segment of the audio files pertinent to when those trigger words are spoken in the received audio files.

18. A method of language identification, comprising:

receiving an audio stream consisting of a spoken language of at least one of a set of two or more potential languages being spoken in the audio stream under analysis;

identifying a most likely phoneme occurring each time in the audio stream under analysis in the set of two or more potential languages with a universal phoneme decoder that contains a universal phoneme set representing both 1) all phonemes occurring in the set of two or more spoken languages, and 2) captures phoneme correspondences across languages, such that a set of unique phoneme patterns and probabilities are calculated;

supplying probabilities of how linguistically likely a particular uttered phoneme identified by the universal phoneme decoder comes from a particular spoken language based on an identified sequence of phonemes from one or more statistical language models, wherein each statistical language model uses linguistic features from the identified phonemes from the universal phoneme decoder including the set of unique phoneme patterns created for each language in the set to distinguish between spoken human languages in the set of two or more spoken languages;

referencing a first human language specific database with a first statistical language models, where of the first human language specific database was filled with phoneme and phoneme sequences being trained on for a particular language in the set of two or more spoken languages during a training phase, and each of the human language specific databases that includes the first human language specific database received the phoneme and phoneme sequences from a phone output from the same universal phoneme decoder independent of which spoken language in the set of two or more potential languages was being trained on, however, each human language specific database was filled one at a time on a per specific language basis; and at run-time, identifying a particular human language being spoken in the received audio stream in the set of two or more potential languages by utilizing the linguistic probabilities supplied by the one or more statistical language models that are based on the set of unique phoneme patterns created for each language.

19. The method of claim 18, further comprising:

during the run-time language identification phase, language ID parameters for each language to be identified are loaded into a run-time language identifier module;

during the run-time language identification phase, a new utterance is compared to each of the language-dependent statistical models, and the likelihood that the language of the utterance matches the languages used to train the models is calculated by the run-time language identifier module; and a language-dependent statistical language model determined by the run-time language identifier module most likely to be correct is then selected by the run-time language identifier module.

20. The method of claim 19, wherein the run-time language identifier module queries the one or more statistical language models cooperating with the human language specific databases filled in the training process to observe enough phoneme sequences that correspond to spoken audio so that the run-time language identifier is able to identify the spoken language by utilizing the one or more statistical models, and training on each human language occurred one language at a time to fill each corresponding human language specific database to maximize an accuracy of both a per-language recognition accuracy in identifying a correct phoneme being spoken in that language as well as a language identification process of which language is being spoken.

21. The method of claim 19, further comprising:

identifying each phoneme with the universal phoneme decoder to identify the language being spoken from an audio stream of a live broadcast as well as detecting and identifying a new language being spoken within the same audio stream;

supplying the identified language and identified phonemes to a speech recognition module, and subsequently identifying each word in the identified language with the speech recognition module from the audio stream of the live broadcast;

encoding each of the identified phonemes and identified words from the audio stream of the live broadcast;

assigning a time indication with each of the identified words, where each of the identified words shares a common time reference;

generating a synchronized link to relevant material based on the content of the live broadcast, the synchronized link to be displayed with the live broadcast; and synchronizing the synchronized link to appear at approximately an utterance of the most relevant word related to the content of the live broadcast, wherein the link to relevant material based is generated upon the one or more words being spoken and synchronizing a display of the link in less than ten seconds from analyzing the audio stream of the live broadcast.

* * * * *